June 11, 1957 W. A. O. MARTIN 2,795,106
LIQUID FUEL SYSTEMS
Filed June 25, 1953 3 Sheets-Sheet 1
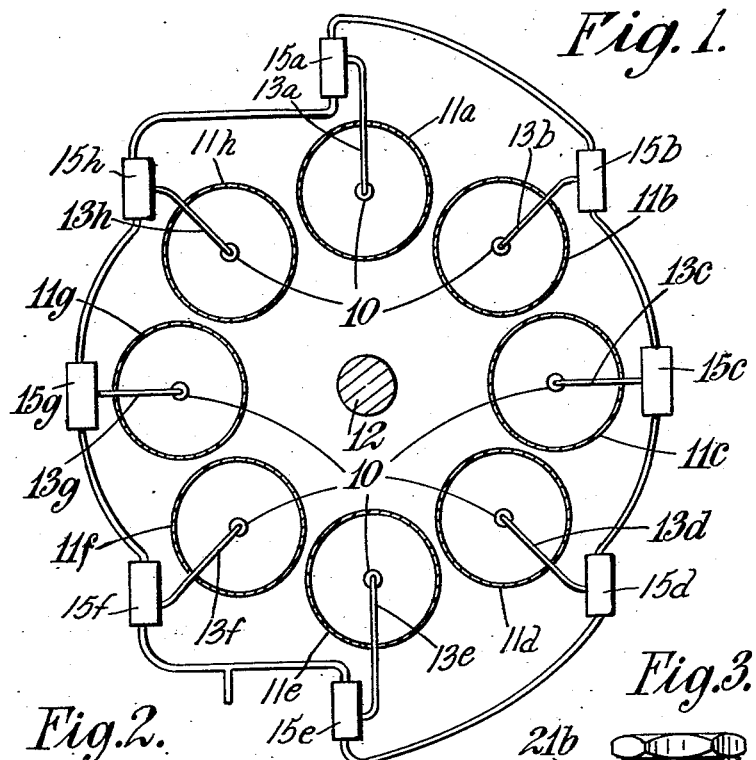
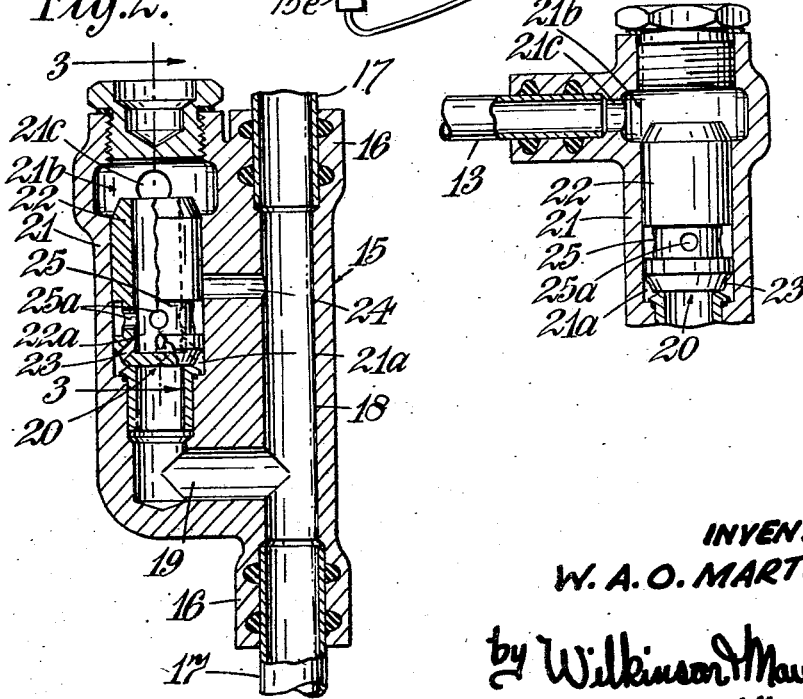
INVENTOR
W. A. O. MARTIN
by Wilkinson Mawhinney
Attys.

June 11, 1957 W. A. O. MARTIN 2,795,106
LIQUID FUEL SYSTEMS
Filed June 25, 1953 3 Sheets-Sheet 2
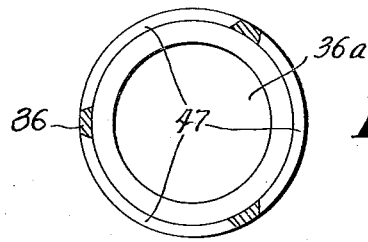
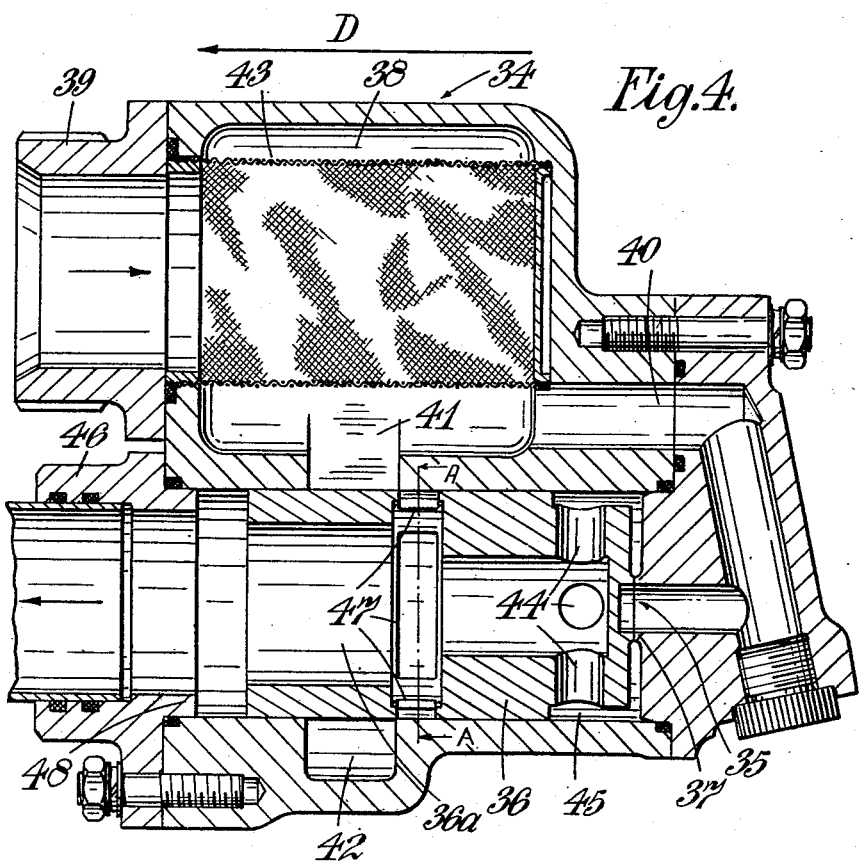
INVENTOR
W. A. O. MARTIN
by Wilkinson Mawhinney
Attys.

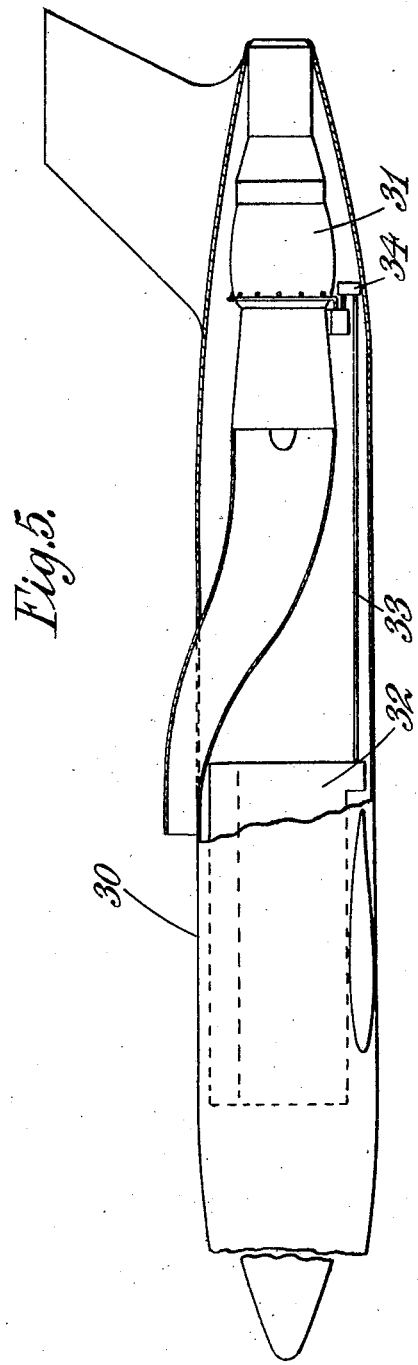

United States Patent Office 2,795,106
Patented June 11, 1957

2,795,106

LIQUID FUEL SYSTEMS

William Alexander Onslow Martin, Littleover, England, assignor to Rolls-Royce Limited, Derby, England, a British company Application June 25, 1953, Serial No. 364,121

Claims priority, application Great Britain July 4, 1952

8 Claims. (Cl. 60—39.37)

This invention relates to liquid-flow systems, and is particularly concerned with fuel systems for power plants such as gas-turbine power plants. Such fuel systems include both fuel systems which form integral parts of the power plants, and also, where the power plant is mounted in a vehicle, the vehicle fuel system which serves to supply the power plant from the fuel storage tank of the vehicle.

In a fuel system of a gas-turbine or the like power plant, there is often provided a fuel manifold feeding the fuel injectors of the gas-turbine engine, and it has been found that owing to the difference in the head of fuel between the points at which the pipes supplying the fuel injectors are connected to the manifold, there is a difference between the rates of fuel flow to the injectors.

The difference in the fuel pressure at two points in the manifold, and, therefore, in the fuel pressures in pipes connected to the manifold at those two points for supplying fuel injectors, is proportional to the product of the height of the column of fuel measured in the direction of an acceleration acting on the fuel, and the acceleration acting upon the fuel.

In stationary engines, therefore, the difference in the fuel pressure in pipes connected to the manifold at two points is solely dependent on the difference in the height of those points.

In aircraft power plants, the differences in head may be considerably increased owing to the high accelerations produced in manoeuvring the aircraft, and, consequently, the rate of fuel flow to a fuel injector subjected to the highest pressure may be considerably greater than the rate of fuel flow to the fuel injector subjected to the lowest pressure, and this difference in fuel flows will have an adverse effect on the functioning of the power plant. The acceleration may act vertically, or transversely or may have both a vertical and a transverse component.

In copending application Serial No. 279,655, filed March 31, 1952, in the name of H. Cook and assigned to the same assignee as the present application, there is described a liquid flow system comprising a pressure source of liquid and a plurality of liquid flow conduits having restricted outlets, which conduits are connected to said source to receive liquid therefrom and are so disposed at levels in relation to one another that the liquid pressures controlling the flows in the conduits are different due to the different liquid heads to which they are subjected, wherein each of a plurality of the liquid-flow conduits has located in it a valve loaded to oppose the flow through the conduit and wherein the loads on the valves are individually adjusted to compensate for the differences in liquid heads.

The adjustment of the loads on the valves is described as being effected by selecting the mass of a movable valve member which co-operates with an inlet orifice, in relation to the area of the inlet orifice, or in a construction in which the valve member is loaded by a spring by selecting the spring load in relation to the area of the inlet orifice, or alternatively in certain cases by selecting both the mass of the movable valve member and the spring load in relation to the area of the inlet orifice.

It is one object of the present invention to provide an improved liquid flow system as described in the specification of application Serial No. 279,655.

The invention has an important application in the fuel systems of vehicles, more particularly aircraft, from which the vehicle power plant is supplied; in certain types of vehicle fuel system, the fuel storage tank may be at a considerable distance from the power plant, and there may thus be a considerable head of fuel between the fuel storage tank and the power plant. This head of fuel will be in proportion to the product of the height of the column of fuel in the direction of the acceleration acting on it, and the acceleration. If the acceleration is increased, the head of fuel will be increased and an excessive quantity of fuel may be delivered to the power plant, causing an over-rich mixture which may have a serious adverse effect on the operation of the power plant.

For example, the fuel storage tank may be located in the forward part of an aircraft, and the power plant in the rear part; on launching the aircraft by means of a rocket, a large acceleration may be caused, tending to increase the pressure at the power plant end of the fuel conduit from the tank to the power plant and thereby to cause an excess of fuel to be delivered to the power plant.

A valve comprising a movable valve member co-operating with an inlet orifice may be employed in such an aircraft fuel system, wherein the load on the valve is arranged to compensate for the difference in the head of fuel due to the acceleration of the aircraft. The compensation is effected by choosing the mass of the movable valve member in relation to the effective area of the inlet orifice such that $m = \rho h$ where $m$ is the mass per unit orifice area, $\rho$ is the density of the fuel and $h$ is the height of the column of fuel, measured in the direction of the acceleration to be compensated.

It has been found that where an acceleration-compensating valve is designed for a large flow of fuel, and the valve inlet orifice is of sufficiently large area to prevent excessive pressure drops being developed across it, the mass of the co-operating weight may become inconveniently great.

According to the present invention, therefore, it is arranged that part only of the liquid flowing to a liquid flow conduit passes through the inlet orifice of an associated valve which is loaded by an amount selected in relation to the area of the orifice to compensate for a liquid head produced by an acceleration and the remainder of the liquid flowing to the liquid flow conduit passes through ports, the area of which is controlled to be dependent on the opening of the inlet orifice, the ports being such that flow through them produces substantially no opening or closing load on the valve.

According to a feature of the invention, the valve comprises a movable valve member in the form of a hollow piston whereof the head co-operates with a seating around the inlet orifice, and whereof the skirt is formed with ports the extent of opening of which ports is determined by the amount of lift of the valve member from the seating of the inlet orifice.

The valve may be loaded to oppose the flow of liquid, where it is desired to compensate for changes in a head of liquid, either solely by the choice of the mass of the movable member in relation to the inlet orifice area, or by the choice of the mass of the movable member in conjunction with a spring load, or where it is desired to compensate for a constant head of liquid, solely by the choice of a suitable spring load.

Two embodiments of this invention will now be described by way of example, the description referring to the accompanying drawings, in which:

Figure 1 is a diagrammatic illustration of a gas turbine engine fuel system,

Figure 2 is a section through one form of compensating valve according to this invention, and Figure 3 is a section on the line 3—3 of Figure 2, Figure 4 is a section through a second form of compensating valve, Figure 4a is a section taken on line A—A of Figure 4, and Figure 5 illustrates a use of the valve of Figure 4.

In one embodiment, Figures 1 and 2, there is shown a fuel system of a gas turbine engine. Such a fuel system normally comprises a ring of fuel injectors 10 by which fuel is supplied to the combustion equipment of the engine, illustrated as comprising a plurality of separate combustion chambers 11a, 11b, 11c, 11d, 11e, 11f, 11g, 11h disposed in a ring around a central shaft 12. The injectors 10 are connected to receive fuel by means of branch pipes 13a, 13b, 13c, 13d, 13e, 13f, 13g, 13h from a circular manifold 14 disposed transversely of the engine.

The pressure of the fuel in the lowest branch pipe will be greater than that in the highest branch pipe (measured in the direction of an acceleration acting on the system) due to the head of fuel in the manifold. For example, if the fuel being supplied to the fuel injection devices is paraffin and the manifold has a diameter of about 3 feet, then the pressure in the branch pipe 13e joined to the manifold at its bottom point will be greater than the pressure at its top point, at the junction of branch pipe 13a, by about 1 lb./sq. in. under normal conditions of acceleration due to gravity. If the acceleration is say 15 g., due to manoeuvring of the aircraft in which the engine is installed, then the difference in pressure will be about 15 lb./sq. in. If each branch pipe 13a, . . . 13h is connected to the manifold 14 through a simple pipe connection then there will be a corresponding difference between the pressures at the fuel injectors 10 which are connected to the manifold at different levels, and this will result in a difference in the fuel flows of the fuel injectors. Since the difference in pressures due to acceleration may be of the same order as the actual fuel pressure in the manifold 14, especially at high altitude where the fuel flows to the injectors 10, and consequently the fuel pressure in the manifold, is substantially lower than the value at ground level, it is important that compensation should be made if a wide variation between the quantities of fuel delivered by the injectors is to be avoided.

The present invention provides the following compensating arrangement.

The branch pipes 13a, 13b . . . 13h are connected to the manifold 14 by corresponding unions 15a, 15b, 15c, 15d, 15e, 15f, 15g, 15h. Each union 15 comprises (Figure 2) a valve body 21 having a through passage 18 terminating in sockets 16 to receive the ends of pipe sections 17 of the manifold 14 and forming the inlet to the valve body. The passage 18 has leading from it a first branch passage 19 and a second branch passage 24. The first branch passage 19 leads to an inlet port 20, flow through which is opposed by a movable valve member 22 in the form of a weight which slides in the valve body 21.

The inlet port 20 leads to a cylindrical chamber 21a in which the valve member 22 slides and arranged with its axis vertical when it is desired to compensate for differences in fuel heads due to vertical accelerations, and the valve member 22 has a number of ports 23 communicating with a central bore 22a formed in it to afford a free passage for fuel from the inlet end of chamber 21a to an enlarged outlet space 21b. An outlet socket 21c communicates with the space 21b and receives an end of the appropriate branch pipe 13.

The second passage 24 opens laterally through the wall of the chamber 21a at such a position that when the weight 22 is on its seating around the inlet port 20 the passage 24 is closed and so that when the weight 22 lifts, a circumferential groove 25 begins to overlap the end of the passage 24 so allowing a flow of fuel to the bore 22a to augment the flow from the port 20. The extent of opening of the end of passage 24 will depend on the extent of lift of the weight 22 off the seating around port 20, the weight acting under the influence of an acceleration or acceleration component parallel to the direction of sliding of the weight 22 to restrict the flow of fuel through port 20. The mass of the weights 22 is chosen in relation to the area of ports 20 to compensate for the difference in the fuel pressures existing in the manifold. For example the difference in mass per unit orifice area $m$ of two weights will be given by $m = \rho h$ where $h$ is their difference in height in the direction of the acceleration and $\rho$ is the liquid density.

It will be appreciated that the flow through the passage 24 is radial to the line of movement of the valve member 22, and therefore the flow imposes no axial load on the valve member 22 in the sense of opening or closing the inlet port 20, due to the pressure drop created by flow from the passage 24 into groove 25.

In an alternative arrangement, the valve bodies 15 may all be arranged so that the directions in which the valve members 22 slide intersect on the axis of the engine, i. e. the directions are radial to the manifold axis, and each valve member 22 is loaded by a spring in the sense to restrict the opening of the orifice.

The mass of each movable valve member 22 per unit area of the associated inlet port is then made equal to $$\rho \frac{h}{2}$$

where $\rho$ is the density of the fuel and $h$ is the diameter of the manifold, and if the pre-load afforded by the spring is S per unit orifice area and $g$ is the acceleration, it can be shown that the difference between the pressure drops across valves at the lowermost and uppermost points of the manifold is $$(S+mg)-(S-mg)=2mg=\rho h g$$

that is, the difference in the pressure drops equals the difference in the heads of fuel at the top and bottom of the manifold.

As in the previous arrangement no axial load is imposed on the valve bodies due to the pressure drop in the flow of fuel from passage 24 into groove 25.

By adoption of a valve element as in the above described arrangements, the total area of port 20 and passage 24 may be such that the pressure loss across each valve is reduced to an acceptable figure at the maximum fuel flow envisaged, while the area of the inlet port 20, and consequently the mass of the movable valve member 22, and the strength of the spring in the second arrangement, may be chosen so that the size and weight of the device is greatly reduced as compared with the size and weight that would be necessary if the whole flow of fuel passed through the inlet port 20.

It is preferable that the end of passage 24 begins to be uncovered simultaneously with opening of the inlet port 20, but if desired it may be arranged that the end of passage 24 may first be uncovered after the movable valve member 22 has moved off the seating around the inlet port 20 by a certain amount.

Referring now to Figures 4 and 5, there is shown a form of the invention in the fuel system of an aircraft 30. The power plant 31 is situated in the tail of the aircraft, and the fuel tank 32 is situated adjacent the centre of gravity of the aircraft, and the fuel is supplied from the tank to the engine through a pipe 33.

The take-off of the aircraft is intended to be assisted by the use of rockets, and there is thus a high longitudinal forward acceleration of the aircraft during take-off, which tends to increase the fuel pressure at the engine; the acceleration may be considered as a rearward acceleration of equal magnitude acting on free bodies within the aircraft, such as the fuel, relative to the aircraft.

In a case where the height of the column of fuel, measured in the direction of acceleration, is say 24 ft., and the acceleration is 40 g. the additional pressure at the engine, assuming the fuel used to be paraffin, will be approximately 335 lb./sq. in.

In order to compensate for this increase of fuel head, a simple valve could be used comprising a movable member co-operating with an inlet port and loaded to move rearwards due to the acceleration to oppose the flow through the inlet port. However, in order that the pressure drop through the valve shall be limited to an acceptable figure at the high fuel flow required, which may be of the order of say, 6000 lb./hour, it would be necessary to make the inlet orifice of such a simple valve of comparatively large diameter, say 0.875 in., and the mass of the movable member would thus have to be approximately 5 lbs. to satisfy the condition that the mass of the valve per unit area of the inlet orifice is equal to the product of the height of the column of fuel and its density.

In order to overcome this disadvantage, and to permit the use of a movable valve member which is lighter and of more convenient size, the following valve arrangement is adopted. The pipe-line 33 from the fuel tank 32 is connected to a device including a valve body 34. The valve body has in it an inlet port 35, and the flow through the inlet port is opposed by a movable weight member 36 arranged to co-operate with a seating 37 round the inlet port 35, due to the acceleration acting rearwardly on the valve member, relative to the aircraft, during forward acceleration of the aircraft. The flow through the inlet port 35 is arranged to be in the longitudinal direction toward the front of the aircraft so that the effect of the weight member 36 during forward acceleration is to restrict the flow through the port.

A chamber 38 is provided in a portion of the body 34 which is to one side of the valve chamber housing the member 36 and the chamber 38 has an inlet 39 formed by a union to which pipe-line 33 is connected. The chamber 38 has two outlets, one in the form of a duct 40 leading to the inlet port 35 and the other in the form of a port 41 leading to a fuel gallery 42 encircling the movable weight member 36. Conveniently, the chamber 38 houses a cylindrical fuel filter 43, and the fuel filter is disposed within the chamber 38 in such a manner that the pipe-line 33 from the fuel tank 32 delivers fuel into the interior of the filter which is spaced from the wall of the chamber 38 so that the outlet side of the filter 43 is connected directly to the gallery 42 and to the duct 40 which is formed by drillings in the valve body containing two right-angle bends.

An annular space 45 is formed round that end of the movable weight member 36 which co-operates with the seating 37 round the inlet port 35, and the movable weight member 36 itself is in the form of a hollow piston which is, except for space 45, a good sliding fit in the bore of the valve chamber. Drillings 44 are formed in the member 36 to place the space 45 in communication with its hollow interior 36a of the member 36, and the interior is in communication with the outlet conduit 46 of the valve body 34. At approximately the mid-length of the valve member there are formed circumferentially-extending ports 47 which communicate with the interior 36a, and which co-operate with the gallery 42 surrounding the weight member 36 when it is lifted off seating 37.

It is preferably arranged that on sliding of the valve member 36 in its bore these ports 47 open to the gallery 42 to allow the fuel to flow radially inwardly into the hollow interior 36a of the valve member 36 simultaneously with the lifting of the valve member 36 off the seat 37 surrounding the inlet port 35. An abutment 48 is provided to limit movement of the member 36 towards the exit conduit 46, and it is arranged that when no rearward acceleration (relative to the aircraft) is acting on the member 36 (and it is held against the abutment 48 due to the fuel pressure), the ports 47 are fully open to the fuel gallery 42. It will be clear that the fuel flow through ports 47 gives no loading of the member 36 tending to move it axially.

I claim:

1. The combination of conduit means, through which flows liquid fuel forming a column of liquid having a component of length, with a valve body having a chamber parallel to said component of length, a first inlet at one end of the chamber, said inlet being connected to said conduit means at one end of the component of length of the liquid column, an outlet at the other end of said chamber, said outlet being spaced from the inlet in a direction towards the other end of said component of length, a valve member slidable in said chamber in the direction parallel to said component of length and cooperating with said first inlet, the mass of the valve member being equal to the mass of a uniform column of liquid of which the density is the fuel density, the height is the component of length, and the cross-section area is the cross-section area of said first inlet, thereby to compensate for acceleration acting on said column of liquid along said component of length, and a second inlet port in said valve body opening from said conduit into said chamber at right angles to said direction of sliding of said valve member, and lateral port means formed on said valve member and cooperating with said second inlet port to permit flow therethrough on opening of said first inlet port due to movement of said valve member, the valve member having bore means placing that part of the chamber adjacent the first inlet and the lateral port means in communication with the outlet.

2. The combination as claimed in claim 1 comprising a seating in said valve body around said first inlet and projecting towards said outlet, said valve member having at its end adjacent the first inlet a head cooperating with said seating and said lateral port means being at a position in said valve member to uncover the second inlet port when the valve member moves away from said seating.

3. In a gas turbine power plant having a combustion section, a plurality of fuel nozzles mounted at different vertical locations within the combustion section, a source of fuel and at least one manifold connecting said fuel source and said nozzles; a pressure head compensating valve associated with each of said nozzles, each of said valves having a passage for the flow of fuel therethrough, a movable closure interposed in the passage and restricting fuel flow, a seat for the closure defined by the passage walls, the closure and seat being positioned so that gravity will have a maximum effect in seating the closure, the weight of each closure being individually selected and decreasing as vertical height increases, and each of said valves also having a connection from said manifold to said opening into said passage in a direction at right angles to the direction of movement of the movable closure and at a position downstream of the seat, said movable closure cooperating with said connection to permit a flow therethrough when the closure member moves away from the seat.

4. In a gas turbine power plant fuel system having a plurality of fuel nozzles at different vertical locations with respect to the power plant axis; a valve associated with each nozzle for compensating for a difference in pressure head at the nozzles, each valve having a passage for the flow of fuel therethrough, a movable closure interposed in the passage and restricting fuel flow, and a seat for the closure defined by the passage walls, fuel flow through each valve being regulated by individually selecting the weight of each closure, said closure decreasing in weight as vertical height increases, and each valve having a second passage for the flow of fuel therethrough opening into said first passage in a direction at right angles to the direction of movement of the movable closure and at a position downstream of the seat, said movable closure cooperating with said second passage to permit a flow therethrough when the movable closure moves away from its seat.

5. In a fuel system including fuel conduit means having an upstream part in which the fuel pressure may be increased at the downstream end by an amount dependent upon the density of the fuel, upon a component of length of said upstream part and upon an acceleration of the fuel towards the downstream end of said upstream part experienced in operation of the system; a valve to produce a drop in fluid pressure equal to said increase thereby to compensate for said acceleration comprising a valve body, means defining a chamber in said valve body the axis of which chamber is parallel to the direction of said component of length of the upstream part, means defining a first inlet port to said chamber at the end thereof adjacent the downstream end of said upstream part, said first inlet port communicating with the downstream end of said upstream part of said conduit means and opening into a first space of said chamber, a valve member slidable in said chamber in the direction of said axis and adapted to cooperate with said first inlet port, the mass of the valve member being chosen in relation to the area of the first inlet port, the component of length and the fuel density to restrict the flow of fuel therethrough into said first space to compensate the increase of fuel pressure acting on the valve due to the acceleration, means affording a second inlet port opening into said chamber at right angles to said axis, lateral port means formed on said valve member and adapted to cooperate with said second inlet port to permit flow therethrough on opening of said first inlet port due to movement of said valve member, and outlet means communicating with said first space and with said lateral port means.

6. A valve as claimed in claim 5, comprising a seating around the first inlet port means projecting into said first space, and having said valve member in the form of a piston whereof the head co-operates with said seating and whereof said lateral port means is disposed in said piston to uncover the second inlet port means when the valve member moves away from said seating.

7. A valve as claimed in claim 6, having said piston provided with a central bore in communication at one end with said first space of the chamber and in direct communication at its other end with the outlet means, and also provided with a circumferential groove to overlap the second inlet port means when said piston moves from said seating, the lateral port means extending from the bottom of said groove into said central bore.

8. In a fuel supply system for a power plant mounted in an aircraft and comprising a fuel source, and a fuel line adapted to lead from said source to said power plant, said fuel line having a component of length adapted to extend through said aircraft so that due to acceleration of said aircraft the fuel pressure therein is affected by both the fuel source pressure and the acceleration acting on the fuel therein; a fuel-pressure-responsive valve interposed in said fuel line, said control valve comprising a valve body having an inlet connected to the downstream end of said fuel line and an outlet connection; a movable weight member for regulating the flow between said connections, said movable weight member being slidably mounted in said valve body parallel to said component of length and having a fluid passageway communicating at its end nearer said fuel source to communicate with said outlet connection and terminating at its other end in at least one aperture connecting said passageway to a space defined between said weight member and said body remote from the outlet connection, a first port connecting said space and said inlet connection when said valve is open, said first port being gradually closed by axial movement of said movable weight member, said weight member having a predetermined area of the end surface remote from the outlet connection exposed to the pressure of the fuel in said inlet connection, and said weight member having a mass of magnitude dependent on the fuel density, the component of length and the predetermined area that when the power plant is in operation the acceleration force of said weight member opposes the acceleration force of the fuel in the fuel line, and further comprising means defining a gallery in said valve body surrounding said movable weight member and in communication with said inlet connection, and means defining a portion of said weight member of uniform cross-section and having lateral ports therein adapted to place said fluid passageway in communication with said gallery when said valve is open, whereby no axial load is exerted on said weight member due to the flow of fuel through said lateral ports, and whereby the opening of said lateral ports is dependent on the opening of said first port.

References Cited in the file of this patent

UNITED STATES PATENTS

| | | |
|---|---|---|
| 2,622,394 | Murdock et al. | Dec. 23, 1952 |
| 2,637,273 | Stokes et al. | May 5, 1953 |